Oct. 19, 1926.

S. L. TINGLEY

BURNER

Filed July 21, 1924  2 Sheets-Sheet 1

Inventor.
Stephen L. Tingley
by Heard Smith & Tennant
Attys.

Oct. 19, 1926.
S. L. TINGLEY
1,603,649
BURNER
Filed July 21, 1924   2 Sheets-Sheet 2
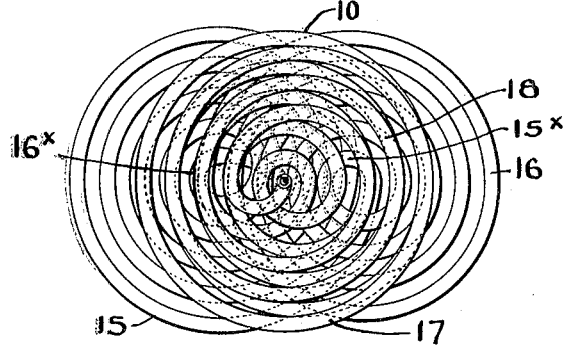
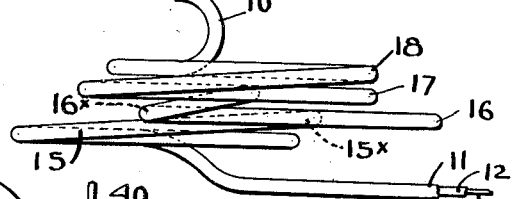
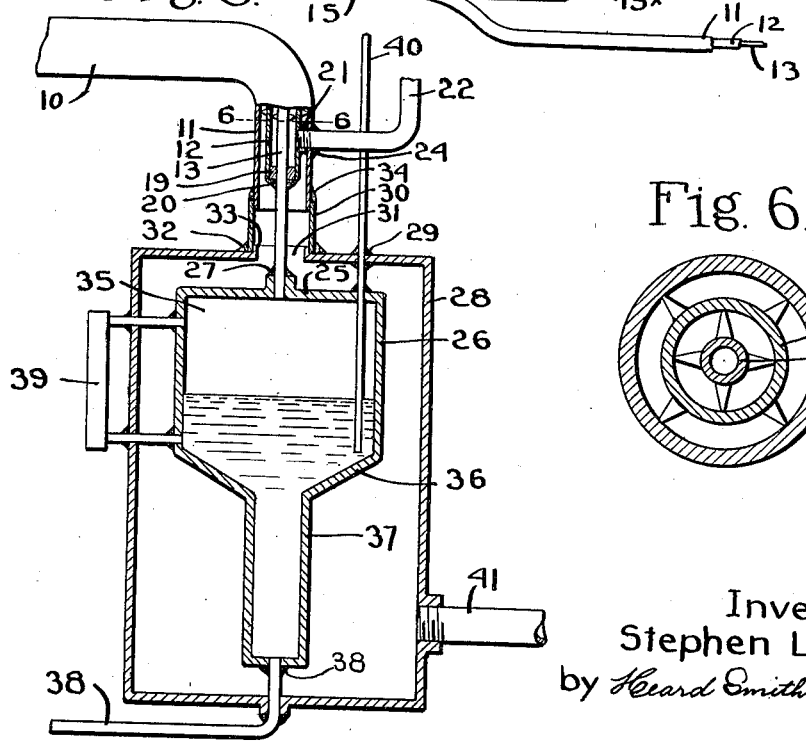
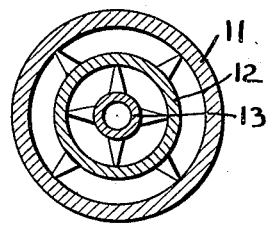
Inventor
Stephen L. Tingley
by Heard Smith & Tennant
Attys Patented Oct. 19, 1926.

1,603,649

UNITED STATES PATENT OFFICE.

STEPHEN L. TINGLEY, OF NITRO, WEST VIRGINIA.

BURNER.

Application filed July 21, 1924. Serial No. 727,134.

This invention relates to improvements in oil or other hydrocarbon burners and the general object thereof is to provide a burner structure comprising means for vaporizing and superheating the vapors of the hydrocarbon to a higher temperature than has heretofore been attained, whereby the more complex hydrocarbons will be dissociated and more volatile hydrocarbons produced and delivered to the burner head.

A further object of the invention is to provide means by which a plurality of fluids may be subject to progressively increasing temperatures to cause the fluids, if liquids, to be vaporized, the vapors thereof highly superheated and so activated that they readily dissociate and more or less recombine into other chemical combinations and are then delivered to the burner head.

More specifically the invention relates to burners for producing and delivering oxyhydrocarbon gas from oil and water, the flame from the oxyhydrocarbon being employed to vaporize the oil and water respectively and progressively to heat the vapors thereof until such temperatures are reached as will cause the dissociation of the oil into light hydrocarbon vapors and production from the water of superheated steam which is more or less dissociated into its constituent elements—hydrogen and oxygen—means preferably being employed to cause the mixture of the dissociated vapors of the oil and highly superheated vapors from the water to produce the oxyhydrocarbon gas which is delivered to the burner head. The phrase "superheated vapors from the water" is used herein to include not only superheated steam, but also such gaseous products of dissociation of the constituents of the water—which is never chemically pure—as may be produced from the water supplied by reason of the excessively high temperature to which the water and its vapors are subjected.

In the particular embodiment of the invention disclosed herein the water and oil pass respectively through concentrically arranged conductors which are subject to the heat of the flame from the burner, the oil and water being progressively heated, vaporized and superheated, whereby the oil is dissociated into less complex hydrocarbons and the steam or vapors from the water highly superheated and more or less dissociated so that when the vapors of the oil and of the water are delivered to a mixing chamber, which preferably contains a catalyst, a fixed oxyhydrocarbon gas will be produced. The oxyhydrocarbon gas is then delivered from the mixing chamber to the burner head.

A further object of the invention is to provide a burner of this character in which a plurality of liquids or gaseous fluids are progressively heated to dissociating temperatures by the heat from the flame with additional heating means comprising a preferably vaporizable heat-transporting and exchanging medium which is so conducted with relation to the other fluids as to impart its heat, or a substantial portion thereof, to the fluids which are being vaporized and dissociated.

A further object of the invention is to provide a burner of the character above described with means for heating the hydrocarbon and oil, so constructed that the water and its vapors surround and form a jacket for the oil and thereby prevent carbonization of the oil upon the wall of its conductor.

A further object of the invention is to provide means for transmitting to the oil and water and the vapors thereof a greater amount of heat than would be supplied by the heat of the flame acting upon the wall of the jacket which encloses the water and its vapors. This is accomplished in the present invention by providing three concentrically arranged conductors preferably coiled into spiral form, supplying water to one end of the outermost coil, oil to the same end of the intermediate coil and a heat-transporting and exchanging medium having a higher thermal capacity, such as mercury or its vapor, to the central conductor, the conductors being preferably located in the field of the flame and the dissociated vapors of the hydrocarbon and the highly superheated vapors from the water delivered to the burner, while the heat-transporting medium is continuously circulated through the central conductor.

A further object of the invention is to provide a burner of this character with means for heating the respective fluids, so constructed as to be subject to a maximum amount of heat from the flame. This is accomplished by coiling the concentrically arranged conductors for the water, oil, and, if employed, the heat-transporting means, into a plurality of superimposed spirals in which the convolutions of each coil overlap the convolutions of each of the other coils and in which the superimposed convolutions are arranged in closely juxtaposed position.

A further object of the invention is to provide means for vaporizing the heat-transporting medium before it enters the central conductor and means for condensing the heat-transporting medium after it has been delivered from the conductor which is subject to the heat of the flame.

A further feature of the invention consists in utilizing the water supplied to the burner coils as a cooling agent for condensing the heat-transporting medium, whereby the transfer of heat from the condensing heat-transporting medium to the water will serve to preheat the water before it reaches the coils which are subjected to the flame of the burner.

A further object of the invention is to cause the heat-transporting medium to flow in the opposite direction to that of the liquids and their vapors which produce the ignitible fluid, whereby the superheated vapors will be first subject to the greatest amount of heat exchanged from the heat-transporting medium and the heat-transporting medium progressively cooled as it approaches the condenser.

In the particular embodiment of the invention disclosed herein the water and hydrocarbon are introduced into their respective concentrically arranged conductors at one end and mercury vapor is introduced from a vaporizing chamber at the opposite end of the central conductor so that the heat from the vaporized mercury will first be delivered to the superheated vapors of the oil and water and will be gradually cooled as it returns to the mercury reservoir in which the mercury is condensed and from which the liquid mercury is again supplied to a vaporizing chamber which is subject to the heat from the flame.

Other objects and features of the invention will more fully appear from the following description and the accompanying drawings and will be particularly pointed out in the annexed claims.

An illustrative embodiment of the invention is disclosed in the accompanying drawings, in which, Fig. 1 is a vertical sectional view of a furnace containing an illustrative form of burner which, together with the means for supplying the various fluids thereto, are somewhat diagrammatically shown;

Fig. 3 is a plan view of the coils for heating, vaporizing and superheating the fluids which are supplied to the burner;

Fig. 4 is a side elevation of the same;

Figure 1:
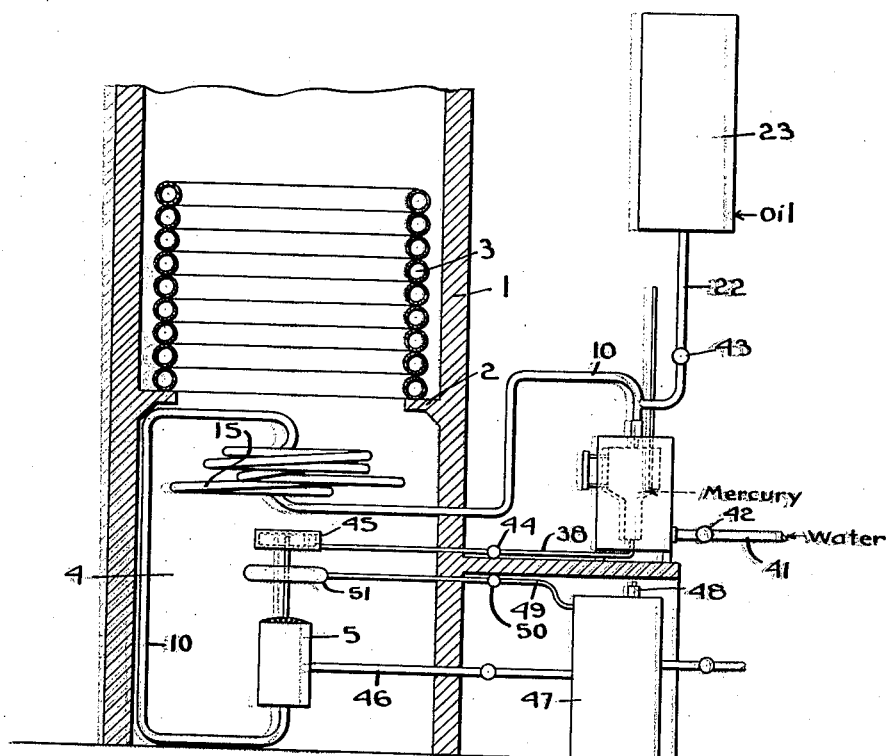
Figure 2:
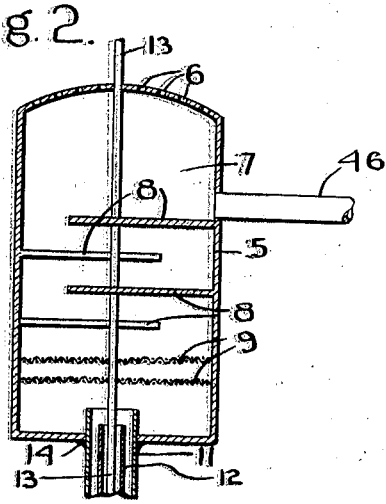
Fig. 2 is a vertical longitudinal section of a burner head and mixing chamber showing in full lines the central conduit for the heat-transporting medium.

Fig. 5 is a vertical sectional view of the water jacketed mercury reservoir and of the end portion of the concentric conductors illustrating the connections for supplying water from the jacket of the reservoir to the outer conductor, the means for supplying oil to the intermediate conductor and the means for connecting the central conductor to the mercury reservoir; and, Fig. 6 is a sectional view of the conductors on line 6—6 Fig. 5, looking downwardly.

Burners embodying my invention may be employed for supplying heat to any furnace or other heater in which a considerable amount of heat is required. The burner is illustrated herein as embodied in a furnace for heating and cracking oil, of the general type disclosed in my prior application Serial Number 652,337 filed July 18, 1923. The furnace as illustrated comprises a wall 1, preferably of cylindrical form, having an arch 2 upon which spiral coils 3 for the material to be heated are supported. The fire-box 4 of the furnace is provided with the usual air inlet (not shown) for supplying air to the burner as will be readily understood.

The burner structure illustrated herein comprises a series of instrumentalities which preferably are connected by welded unions to avoid leakage by reason of unequal expansion of the members of the series. It comprises broadly a plurality of preferably three concentric conduits with means for supplying water to the outermost conduit, oil to the intermediate conduit and mercury, or other suitable heat-transporting medium having a high thermal capacity, to the central conduit.

The concentric conduits are coiled into special superposed spirals in closely juxtaposed position located in the path of the flame from the burner head. Inasmuch as the concentric conduits are subjected to the intense heat of the oxyhydrocarbon flame the conduits should be made of highly refractory metal, such as calorized pipe or duraloy. The conduits for the superheated vapors of the water and steam are delivered to a mixing chamber which may be provided with a head for delivering one or more jets of oxyhydrocarbon gas.

The mercury or other heat-transporting medium is supplied from a suitable reservoir and caused to flow through the system in the opposite direction to the flow of the water and oil and their vapors, means being provided for cooling and condensing the mercury vapors by the transference of heat from said vapors to the water which is supplied to the outermost coil.

By reason of this construction the water and oil are heated at substantially the same progressively increasing temperatures until such temperatures are attained as are above the cracking temperatures of the complex hydrocarbon vapors of the oil and also above the dissociating temperature of water vapor which is in the neighborhood of twelve hundred degrees centigrade and the superheated and more or less dissociated vapors thus produced are delivered to the mixing chamber of the burner head preferably in the presence of a catalyst which aids in forming and fixing the oxyhydrocarbon gas thus formed.

The burner head 5, which is located in the fire-box of the furnace, preferably is of cylindrical form and provided with a suitable outlet or outlets 6 for one or more jets of the ignitible gaseous fluid. As illustrated herein the burner head 5 comprises a mixing chamber 7 for the hydrocarbon vapors and the hydrogen and oxygen which have been dissociated from the superheated steam. A series of staggered baffle plates 8 desirably are located within the mixing chamber to cause the gaseous fluids to pass in a sinuous course and to become more thoroughly intermingled before being delivered from the burner. A catalyst desirably is located within the mixing chamber to facilitate the dissociation of the molecules of superheated hydrocarbon and vapor and to assist in the fixation of the oxyhydrocarbon gas.

As illustrated the catalyst is in the form of wire screens 9 of nickel gauze, or other suitable catalytic material. The superheated and more or less dissociated steam and hydrocarbons are introduced preferably into the bottom of the mixing chamber from the triple concentric conduits 10 heretofore described. The outer conduit 11 which conducts the steam preferably projects a short distance into the mixing chamber beyond the end of the conduit 12 through which the hydrocarbon vapors are discharged, so that the steam in entering the chamber acts by inspiration upon the hydrocarbon contained in the intermediate conduit and thereby produces a substantially uniform flow of the hydrocarbon vapors. The central conduit 13 for the heat-transporting medium preferably extends centrally through the mixing chamber and the burner as illustrated.

In order to avoid any escape of the gaseous fluids the outer conduit 11 desirably projects well through the bottom of the mixing chamber and is secured to it by a welded joint 14.

In order that the fluids within the conduit may be subject to the action of the flame of the burner a sufficient length of time to become thoroughly vaporized and dissociated the triple conduit 10, which leads to the burner, is bent into a series of preferably superposed substantially flat spiral coils, the spirals of the coils being in close juxtaposition. By such coiling of the triple conduit it may be located in a most effective field of the burner and the closely juxtaposed and superposed spirals will serve to spread the flame in such a manner that every portion of the spiral within the field of the flame will be subjected to a maximum degree of heat.

A preferred form of coil is illustrated in Figs. 3 and 4 in which the triple conductor is first bent into a substantially flat spiral 15 beginning at the center with the convolutions progressively increasing a desired number of turns. The end $15^x$ of the last convolution is then bent sharply around to provide the first convolution of the second spiral 16 which is superimposed over the spiral 15 with its center located substantially at the periphery of the first spiral. The end $16^x$ of the last convolution of the spiral 16 is bent abruptly to form the central convolution of a flat spiral 17 which is superimposed over the spiral 16 and 15, but with its center offset from the centers of the coils 15 and 16.

Any number of such coils may be provided. As illustrated in Figs. 3 and 4 the last turn of the spiral 17 instead of being bent abruptly is gradually wound inwardly to produce a flat coil 18, the last turn of which is substantially in alinement with the center of the first coil 15. The end of the central spiral of the coil 18 is then bent upwardly laterally and carried to the burner.

By reason of this construction, therefore, a series of substantially parallel flat spirals are provided in which the series of the spirals are so disposed that the convolution of each spiral overlies in part the convolutions of each of the other spirals. The convolutions of all of the spirals are in sufficiently close juxtaposition to form a structure which will serve to spread the flame and cause it to impinge upon the surface of each of the convolutions in such a manner as most advantageously to heat the contents of the coils. Furthermore the construction is compact and enables the heating coil to present a maximum amount of surface to the flame in a minimum amount of space. It also provides a burner structure which can be readily installed in usual forms of heaters or furnaces. Of course, any other suitable arrangement of superimposed, interlaced or associated coils may be employed within the scope of the invention, the object of the coiling of the conductor being to present a maximum amount of heating surface in the flame and also to provide such an obstruction to the flame as will spread the flame and permit the utilization of the maximum heating efficiency thereof.

It will be noted that in the construction illustrated the liquids are introduced into the lower ends of the conductors of the coils and the gases and superheated vapors produced in the coils are delivered from the upper end of the coils. The inlet end of the coil is extended through the wall of the furnace and any suitable, preferably welded, union, may be provided for supplying the fluids to the respective conduits of the conductor.

In the preferred embodiment of the invention illustrated in the accompanying drawings water is supplied to the outer conduit of the coil from a jacket which surrounds a suitable receptacle for the mercury or other heat-transporting fluid which is supplied to the central coil. The conduit for the oil terminates short of the end of the water conduit and is provided with a suitable union through which the oil may be introduced into the intermediate oil-conducting conduit.

In the construction illustrated herein the intermediate or oil conduit 12 has at its end a plug 19 of suitable metal which is secured to the end of the conduit and to the central conduit 13 by a welded joint 20. Desirably the intermediate conduit is provided with an integral boss 21 located a short distance from its end which is internally screw threaded to receive the screw threaded end of an oil supply pipe 22 leading from a suitable tank 23. The oil conduit 22 passes through a suitable aperture in the outer water conduit and is secured thereto by a welded joint 24. The central conduit 13 projects beyond the ends of the intermediate and outer conduit and enters the top 25 of a mercury reservoir 26. Desirably the top is provided with a boss to receive the end of the central conduit 13 and the latter is secured to said boss by a welded joint 27. The reservoir 26 is provided with a water jacket 28 which communicates with the outer concentric conduit 11.

In order to permit the welding of the joint 27 the lower end of the conduit 11 terminates at a distance from the top 29 of the reservoir and a sleeve 30, which telescopically fits upon the lower end of the conduit 11.

In assembling the apparatus the sleeve 30 may be slipped upon the lower end of the conduit 11 and forced upwardly thereupon a sufficient distance to permit the insertion of a welding tool through the aperture 31 in the top of the water jacket 28. After the joint 27 has been welded the sleeve 30 may be slipped down until its end rests upon the top 29 of the jacket and may be secured thereto by a welded joint 32. Desirably the head of the jacket is provided with a boss 33 which receives the lower end of the sleeve 30. When thus assembled the upper end of the sleeve 30 may be permanently secured to the conduit 11 by a welded joint 34. Thus an integral structure is produced which will prevent the escape of the liquids or the vapors of the mercury which are delivered to the mercury reservoir as will be hereinafter more fully described.

The mercury reservoir desirably is constructed with a cylindrical upper portion 35 providing a relatively large condensing chamber and has a downwardly tapering conoidal bottom portion 36 which communicates with a downwardly extending cylindrical section 37 from the bottom of which liquid mercury is delivered to a pipe 38. The end of the conduit 38 desirably is secured to the bottom of the cylindrical section 37 by a welded joint and is also welded to the bottom of the jacket 28. Desirably the mercury reservoir is provided with a gauge 39 which will enable the depth of mercury in the reservoir to be observed. The mercury reservoir 26 is also provided with a safety pipe 40 extending from well beneath the surface of the mercury to any desired height so that the vent pipe will permit the mercury to ascend in the vent pipe if an excessive fluid pressure is built up in the condensing chamber by the mercury vapor which enters into it. The pipe 40 may also be used as a means for introducing mercury into the reservoir.

By providing the downwardly extending cylindrical section 37 with a reservoir of smaller diameter than the body of the reservoir a relatively deep pool of mercury is obtained for a comparatively small amount of mercury, but which will afford the necessary fluid pressure to force the mercury and its vapor through the central conduit 13.

The water is supplied to the jacket 28 of the condenser by a pipe 41 leading from the service system of the water supply or from a tank of sufficient depth or located at such height as may be required to produce the necessary pressure.

The water supply pipe 41, the oil supply pipe 22 and the mercury conduit 13 are provided respectively with suitable valves 42, 43 and 44 by means of which the supply of the respective liquids may be controlled. The delivery pipe 38 for the mercury leads through the wall of the furnace to a hermetically sealed vaporizing chamber 45 which is located within the field of the flame of the burner 5 at a suitable distance beneath the coil of the triple conduit. The vaporizing chamber, therefore, also acts to spread the flame of the burner.

The central conduit 13 of the conduit, which extends through the upper end of the burner 6, also communicates with the upper portion of the vaporizing chamber 45 so that the mercury vapor which is produced in the vaporizing chamber is driven downwardly through the pipe 13 and thence through the coil and delivered into the upper end of the condensing chamber 35 of the mercury reservoir 26.

In the operation of the device, therefore, the water which enters the water jacket 28 of the mercury reservoir 26 serves as a cooling agent to condense the vapors of the mercury which are delivered to the condensing chamber and by this transfer of heat the water is heated more or less before it enters the inlet end of the outer member 11 of the triple conduit. The oil also enters the intermediate conduit 12 at the same end and flows in the same direction through the coil toward the burner. The oil and the vapors thereof which are produced in the coil are protected from the direct action of the flame upon the conduit through which it passes by the water jacket, thus preventing carbonization of the oil upon the wall of the conduit 12. Furthermore, the water and oil are progressively heated at substantially the same temperatures and as they pass through the coil are respectively vaporized and the vapors thereof heated and superheated to temperatures which will cause cracking of the oil and more or less dissociation of the superheated steam into its constituent elements—hydrogen and oxygen. The superheated vapors from the water issuing with force into the mixing chamber aids by inspiration the delivery of hydrocarbon vapor into the mixing chamber and these mixed gases impinging upon the catalyst and passing in a sinuous course through the burner produces a fixed oxyhydrocarbon gas which issues from the burner and produces the flame which impinges upon the coil.

The mercury vapor which is generated in the vaporizing chamber 45 flows through the conduit 13 in the opposite direction to the direction of flow of the oil and water through the intermediate and outer conduits. Consequently the heat-transporting medium acts first to impart heat to the oxyhydrocarbon gas of the burner and to the superheated vapors from the water and dissociated vapors of oil and becomes gradually cooled as it passes through the system, particularly that portion of the system which contains the liquid oil and water so that the mercury vapor is partially condensed as it approaches the condensing chamber and is fully condensed within the water jacketed chamber. Thus the heat-transporting medium is continuously circulated without substantial loss in volume and a minimum amount of the heat absorbed by the mercury in the vaporizing chamber lost as substantially all of the heat which is not imparted to the oxyhydrocarbon, the highly heated hydrocarbon vapors and the more or less dissociated and superheated steam is imparted to the oil and water either in the conduits or in the water jacket of the mercury reservoir.

In starting the burner it is necessary to supply sufficient heat to the coils to cause at least a sufficient vaporization of the hydrocarbon to produce an ignitable jet of hydrocarbon vapor and this can be accomplished by applying the flame of a suitable torch to the coil. However, when the burner has once been put in operation a greater amount of oxyhydrocarbon gas is generated than is required to produce the necessary burner flame. I have, therefore, provided means for storing the excess of oxyhydrocarbon gas thus generated and utilizing the gas thus stored for initially heating the burner.

As illustrated herein a pipe 46 leads from the mixing chamber to a suitable storage tank 47 which desirably is provided with a pop valve 48 adapted to blow off when more than a predetermined amount of pressure is built up in the storage tank. A pipe 49 provided with a valve 50 leads from the storage tank 29 to a supplemental burner head 51 which desirably is in the form of a ring located at a suitable distance below the vaporizing chamber 45 so that the flames from the supplemental burner 51 may impinge upon the vaporizing chamber 45 and also upon the coil of the triple conductor 10.

When, therefore, the burner is shut down for a time after it has been in operation its operation can be readily resumed by first lighting the supplemental burner to heat the vaporizing chamber and the coils until the production of the oxyhydrocarbon gas is commenced after which the supply of oxyhydrocarbon gas to the supplemental burner may be cut off by closing the valve 50. If desirable the supplemental burner may be employed in conjunction with the main burner.

In order to enable the triple conductor to be coiled or otherwise bent the central and intermediate sections of the conductor desirably are provided with outwardly extending spacing lugs which engage the inner wall of the next outer conductor as illustrated in Fig. 6. Such spacing lugs will, therefore, prevent contact of the walls of the pipe as they are bent into coils. Other spacing means, however, may be provided and any suitable process employed to bend the triple conductor to desirable form.

It will be understood that the embodiment of the invention disclosed herein is of an illustrative character and is not restrictive and that various changes in form, construction and arrangement of parts may be made within the spirit and scope of the following claims.

Having thus described the invention, what is claimed as new, and desired to be secured by Letters Patent, is:

1. A burner comprising a head for delivering one or more jets of gaseous ignitible fluid to produce a flame, a plurality of concentrically arranged conductors subject to heat from said flame, means for supplying an ignitible fluid to one of said conductors, means for supplying a heat-transporting and exchanging medium to another of said conductors whereby the ignitible fluid will be superheated by the action of said flame and said heat-exchanging medium, means for delivering said ignitible fluid to said burner and means for permitting continuous circulation of said heat-transporting and exchanging medium.

2. A burner comprising a head for delivering one or more jets of gaseous ignitible fluid to produce a flame, a plurality of concentrically arranged conductors subject to heat from said flame, means for causing an ignitible fluid to flow through one of said conductors in one direction and means for causing a heat-transporting and exchanging medium to flow through another of said conductors in a direction opposite to the direction of flow of the ignitible fluid.

3. A burner comprising a head for delivering one or more jets of gaseous ignitible fluid to produce a flame, three concentrically arranged conductors subject to heat from said flame, means for supplying water to the outer conductor, means for supplying hydrocarbon to the intermediate conductor and means for supplying a vaporizable heat-transporting liquid of greater thermal capacity than that of the hydrocarbon and water to the central conductor whereby the oil and water will be progressively subject to the same increasing temperatures and the water and oil vaporized and the vapors thereof superheated, means for delivering such superheated vapors to the burner and means for causing a continuous circulation of said heat-transporting and exchanging medium.

4. A burner comprising a head for delivering one or more jets of gaseous ignitible fluid to produce a flame, three concentrically arranged conductors subject to heat from said flame, means for supplying water to the outer conductor, means for supplying hydrocarbon to the intermediate conductor, means for supplying a heat-transporting and exchanging medium to the central conductor and for causing the same continuously to flow in a direction opposite to the direction of flow of said water and oil and means located out of the field of the heat produced by said flame for condensing the vapors of said heat-transporting and exchanging medium during the circulation thereof, and means for delivering the superheated vapors of the hydrocarbon and water to said head.

5. A burner comprising a head for delivering one or more jets of gaseous ignitible fluid to produce a flame, three concentrically arranged conductors subject to heat from the flame, means for supplying water to the outer conductor, means for supplying fluid hydrocarbon to the intermediate conductor, means for supplying a vaporizable heat-transporting and exchanging medium having a greater thermal capacity than that of the water or hydrocarbon to the central conductor, means for continuously circulating said heat-transporting medium and means for delivering the superheated vapors of the water and oil to the burner.

6. A burner comprising a mixing chamber and a head communicating therewith for delivering one or more jets of gaseous ignitable fluid to produce a flame, three concentrically arranged conductors subject to heat from said flame, means for supplying water to the outer conductor, means for supplying liquid hydrocarbon to the intermediate conductor, means for supplying mercury vapor to the central conductor and means for condensing the mercury vapor after it has passed through the central conductor and means for delivering the vapors of the hydrocarbon and water to said mixing chamber.

7. A burner comprising a mixing chamber and a head communicating therewith for delivering one or more jets of gaseous ignitable fluid to produce a flame, three concentrically arranged conductors subject to heat from said flame, means for supplying water to one end of the outer conductor, means for supplying liquid hydrocarbon to the same end of the intermediate conductor, means for supplying a vaporizable heat-transporting and exchanging medium having a greater thermal capacity than that of water or the hydrocarbon to the other end of the central conductor whereby the heat-transporting medium will flow in the opposite direction from that of the flow of water and hydrocarbon and their vapors, means for preheating and vaporizing the heat-transporting medium before it enters said central conductor, means for condensing the vapor of said heat-transporting medium after it leaves the central conductor and means for delivering the vapors of the hydrocarbon and water to the mixing chamber.

8. A burner comprising a mixing chamber and a head communicating therewith for delivering one or more jets of gaseous ignitable fluid to produce a flame, three concentrically arranged coiled conductors located in the path of the flame, means for supplying water to one end of the outer conductor, means for supplying hydrocarbon to the same end of the intermediate conductor, a reservoir for a vaporizable heat-transporting and exchanging medium, a vaporizing chamber located in the field of said flame communicating with said reservoir and with the opposite end of the central conductor to that to which the hydrocarbon and water are supplied to the intermediate and outer conductors, means for returning the vaporized heat-transporting medium to said reservoir and means for delivering the vapors of the hydrocarbon and water to said mixing chamber.

9. A burner comprising a mixing chamber and a head communicating therewith for delivering one or more jets of gaseous ignitable fluid to produce a flame, three concentrically arranged coiled conductors located in the field of the flame, means for supplying water to one end of the outer conductor, means for supplying liquid hydrocarbon to the same end of the intermediate conductor, a reservoir for a liquid mercury, a vaporizing chamber subject to heat from the flame communicating with said reservoir and with the opposite end of the central conductor to that to which water and vapors are supplied to the outer and intermediate conductors respectively, means for returning the mercury vapor from said central conductor to said reservoir and means for delivering the dissociated vapors of the hydrocarbon and highly superheated vapors produced from the water to said mixing chamber.

10. A burner comprising a mixing chamber and a head communicating therewith for delivering one or more jets of gaseous ignitable fluid to produce a flame, three concentrically arranged coiled conductors located in the field of the flame, means for supplying water to one end of the outer conductor, means for supplying liquid hydrocarbon to the same end of the intermediate conductor, a reservoir for a liquid mercury, a vaporizing chamber subject to heat from the flame communicating with said reservoir and with the opposite end of the central conductor to that to which water and vapors are supplied to the outer and intermediate conductors respectively, means for returning the mercury vapor from said central conductor to said reservoir, means for cooling and condensing the mercury vapor in said reservoir and means for delivering the dissociated vapors of the hydrocarbon and highly superheated vapors produced from the water to said mixing chamber.

11. A burner comprising a head for delivering one or more jets of gaseous ignitable fluid to produce a flame, three concentrically arranged conductors subject to heat from the flame, means for supplying water to the outer conductor, means for supplying hydrocarbon to the intermediate conductor, means for supplying a heat-transporting and exchanging medium to the central conductor and for causing the same continuously to flow in a direction opposite to the direction of flow of said water and oil, means for vaporizing said heat-transporting and exchanging medium and means subject to the cooling action of the water supplied to the outer conductor for condensing and cooling the heat-transporting medium delivered from the central conductor and means for delivering the dissociated vapors of the hydrocarbon and the highly superheated vapors produced from the water to said head.

12. A burner comprising a mixing chamber and a head communicating therewith for delivering one or more jets of gaseous ignitable fluid to produce a flame, three concentrically arranged coiled conductors located in the path of said flame, a water jacketed condensing chamber and reservoir for a vaporizable heat-transporting and exchanging medium communicating respectively with opposite ends of the central conductor, an inlet conduit leading to the jacket for said reservoir communicating with the end of the outer conductor corresponding to the vapor delivering end of the central conductor whereby water will be caused to flow through said outer conductor in a direction opposite to that of the flow of the heat-transporting medium through the central conductor and means for supplying oil to the intermediate conductor to cause the oil to flow in the direction of flow of the water in the outer conductor and means for delivering the dissociated vapors of hydrocarbon and the highly superheated vapors produced from the water to the mixing chamber.

13. A burner comprising a mixing chamber and a head communicating therewith for delivering one or more jets of gaseous ignitable fluid to produce a flame, three concentrically arranged coiled conductors located in the path of said flame, a water jacketed condensing chamber and reservoir for a vaporizable heat-transporting and exchanging medium having a downwardly extending section of smaller diameter than the condensing chamber, a vaporizing chamber located in the path of the flame and communicating with the downwardly extending section of said reservoir and with the central concentric conductor, means for causing oil and water to flow through the intermediate and outer conductors in a direction opposite to the flow of the heat-transporting medium through the central conductor and means for delivering the superheated vapors of the oil and the highly superheated vapors reduced from the water to said mixing chamber.

14. A burner comprising a mixing chamber having a head communicating therewith for delivering one or more jets of ignitable fluid to produce a flame, three concentrically arranged conductors coiled into a plurality of superimposed spirals with the convolutions of each coil overlapping those of the others and with said convolutions lying closely adjacent each other, means for supplying water to the outer conductor, means for supplying oil to the intermediate conductor, means for delivering the vapors of the hydrocarbon and oil to said mixing chamber and means for continuously circulating a heat-transporting and exchanging medium having a greater thermal capacity than the hydrocarbon or water through the central conductor.

15. A burner comprising a mixing chamber and a head communicating therewith for delivering one or more jets of gaseous ignitable fluid to produce a flame, a plurality of associated conducting means, for oil and water respectively, subject to the direct action of said flame operable simultaneously to heat and vaporize the respective liquids and to superheat the vapors thereof at the same progressively increasing temperatures to such a temperature as will cause dissociation of the oil vapor and to supply the superheated vapors thereof to said mixing chamber, a reservoir communicating with said mixing chamber to receive the excess of ignitable fluid thus produced, a supplemental burner positioned to project its flame upon the associated conducting means and means for supplying ignitable fluid from said reservoir to said supplemental burner.

16. A burner comprising a mixing chamber and a head communicating therewith for delivering one or more jets of gaseous ignitable fluid to produce a flame, three concentrically arranged conductors subject to heat from said flame, means for supplying water to the outer conductor, means for supplying liquid hydrocarbon to the intermediate conductor, means for generating and supplying mercury vapor to the central conductor, means for condensing the mercury vapor after it has passed through the central conductor, means for delivering the dissociated vapors of the hydrocarbon and the superheated vapors produced from the water to said mixing chamber to produce oxyhydrocarbon gas, a reservoir communicating with said mixing chamber to receive the excess of oxyhydrocarbon gas produced, a supplemental burner communicating with said reservoir positioned to cause its flame to impinge upon the mercury vaporizing means and also upon the heating conductors and thereby operable to produce and supply oxyhydrocarbon gas to said mixing chamber and burner head.

In testimony whereof, I have signed my name to this specification.

STEPHEN L. TINGLEY.